A. RYDQUIST.
CHECK CONTROLLED APPARATUS.
APPLICATION FILED DEC. 17, 1913.

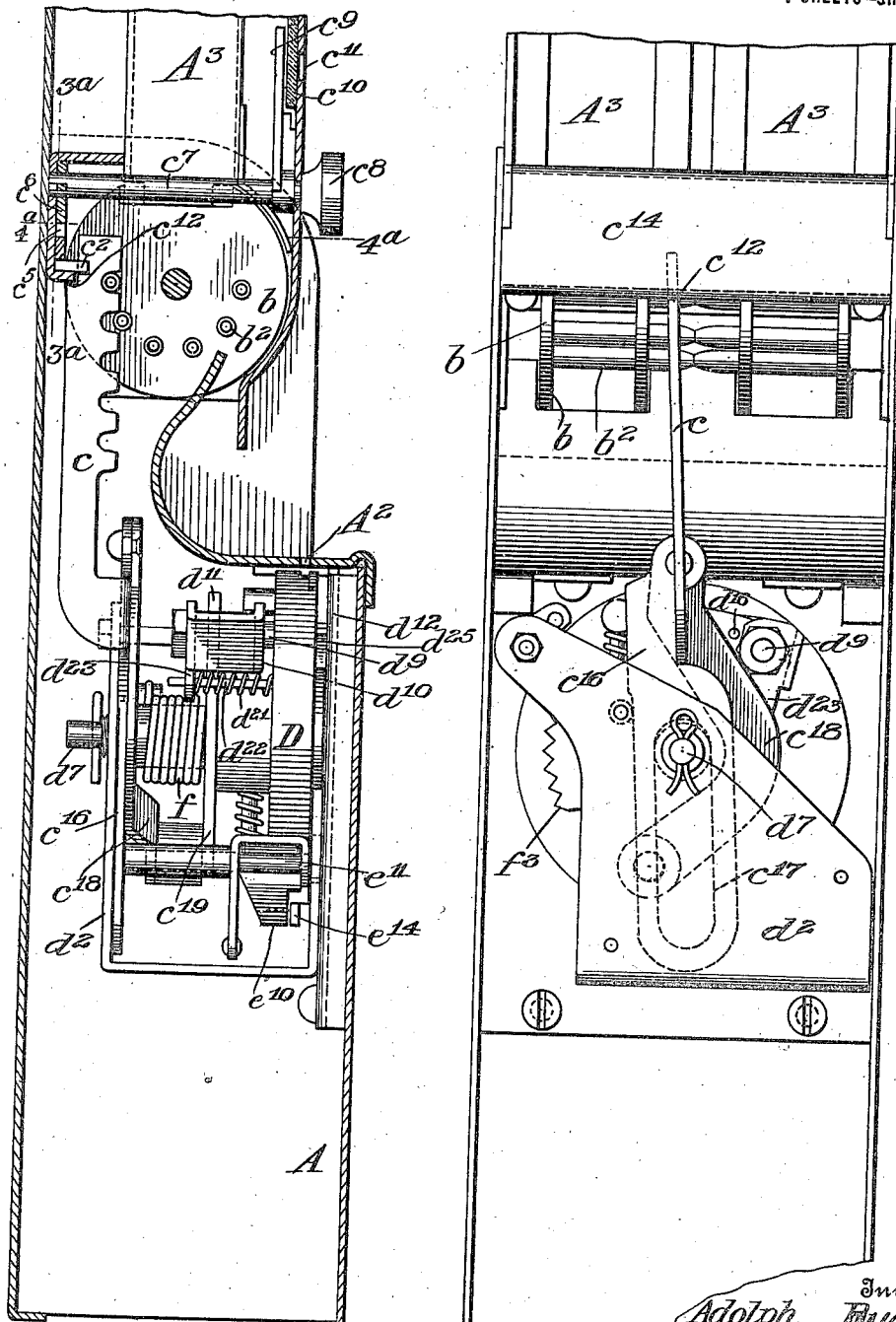

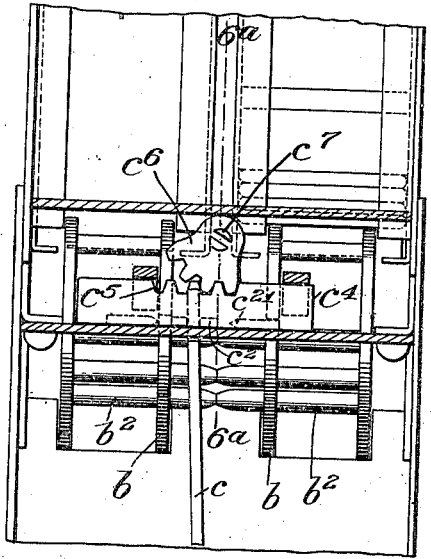
Fig.3
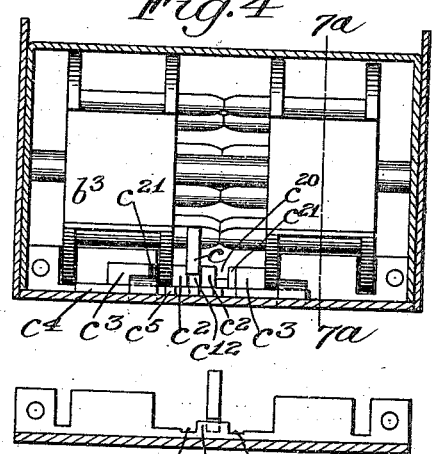
Fig.4
Fig.5
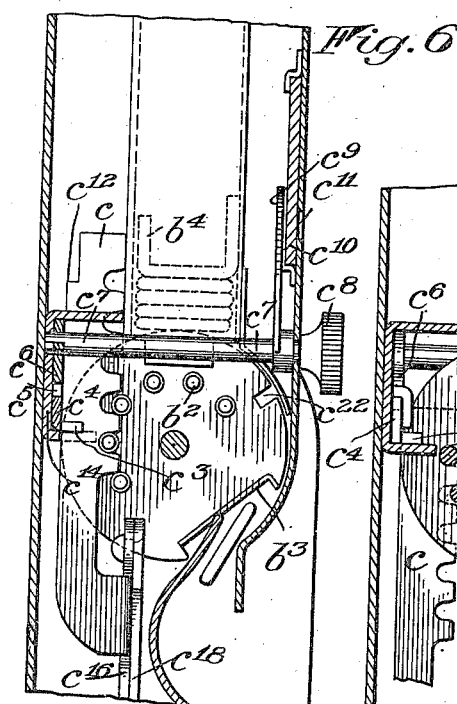
Fig.6
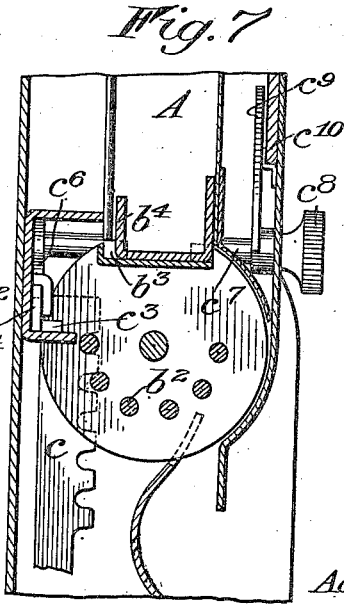
Fig.7
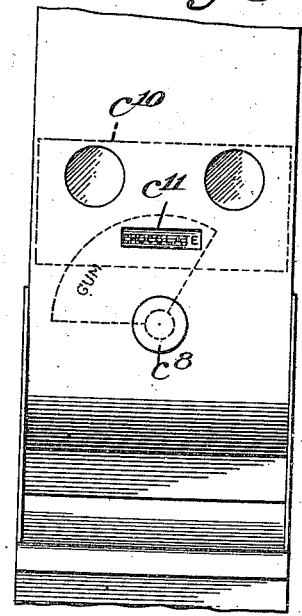
Fig.8
Adolph Rydquist, Inventor

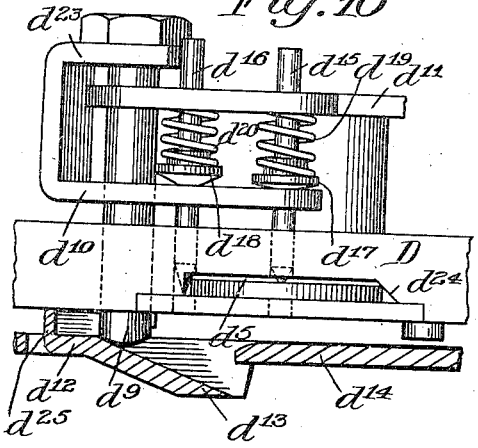
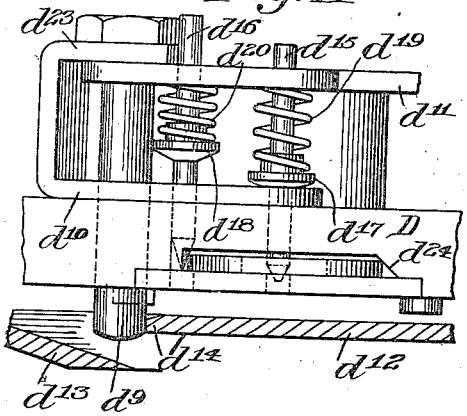
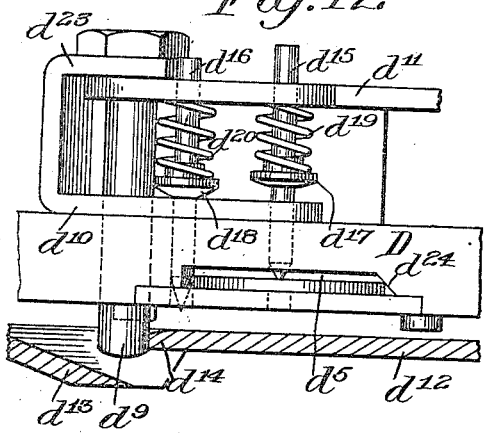
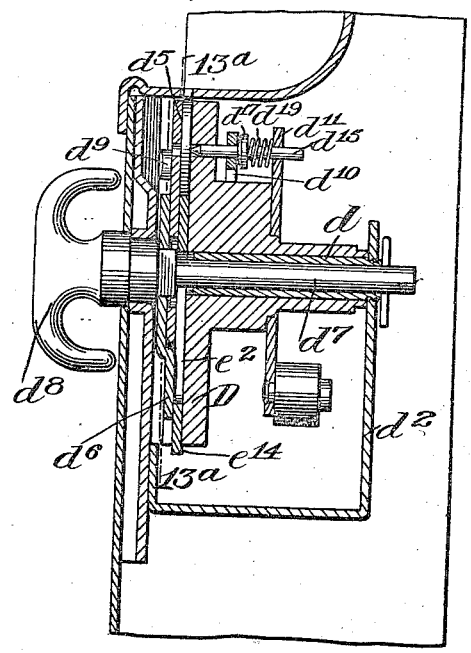

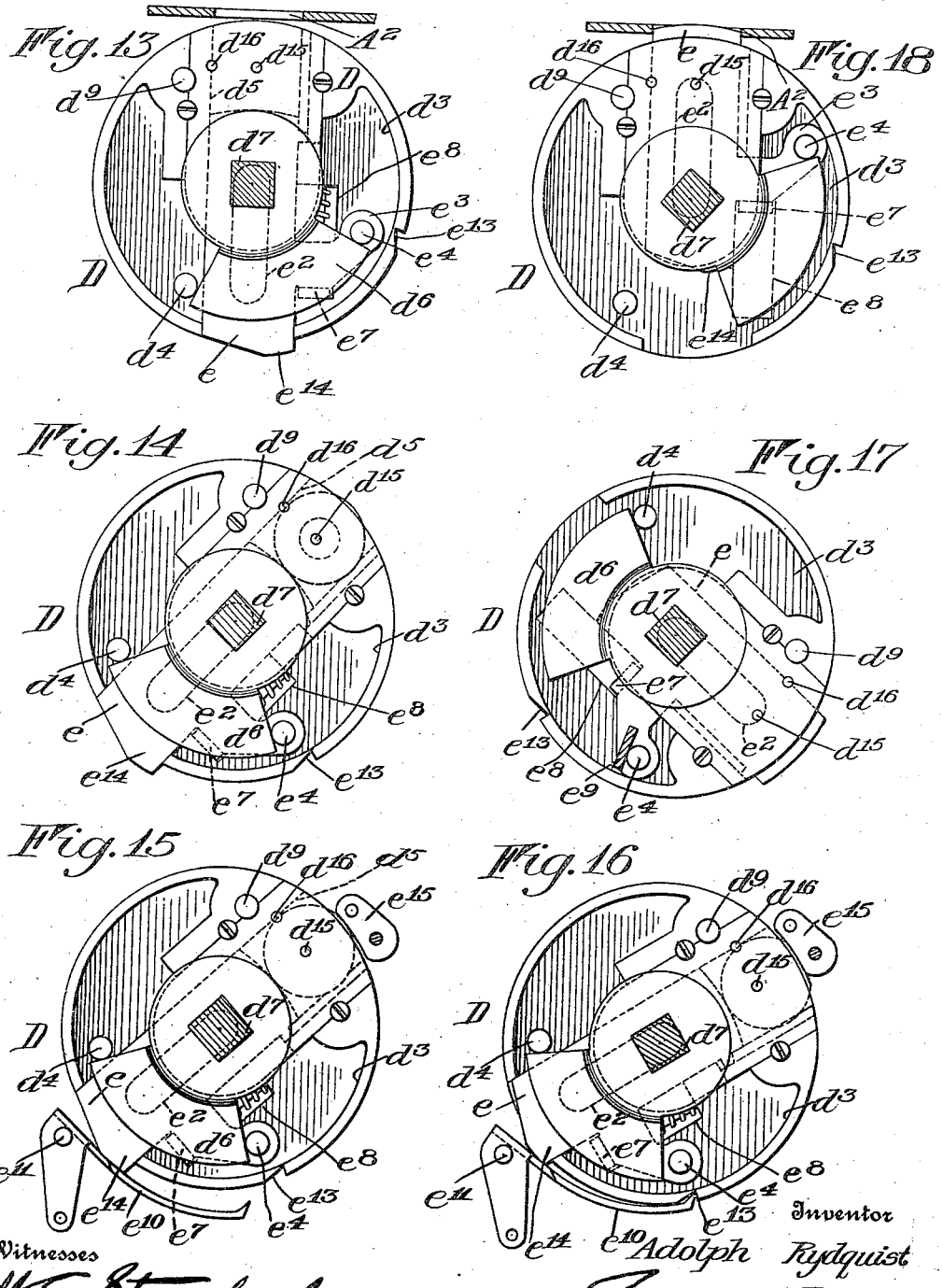

1,226,015.

Patented May 15, 1917.
7 SHEETS—SHEET 5.

Witnesses
H. E. Stonebraker
Walter R. Payne

Inventor
Adolph Rydquist
By Church & Rich
his Attorneys

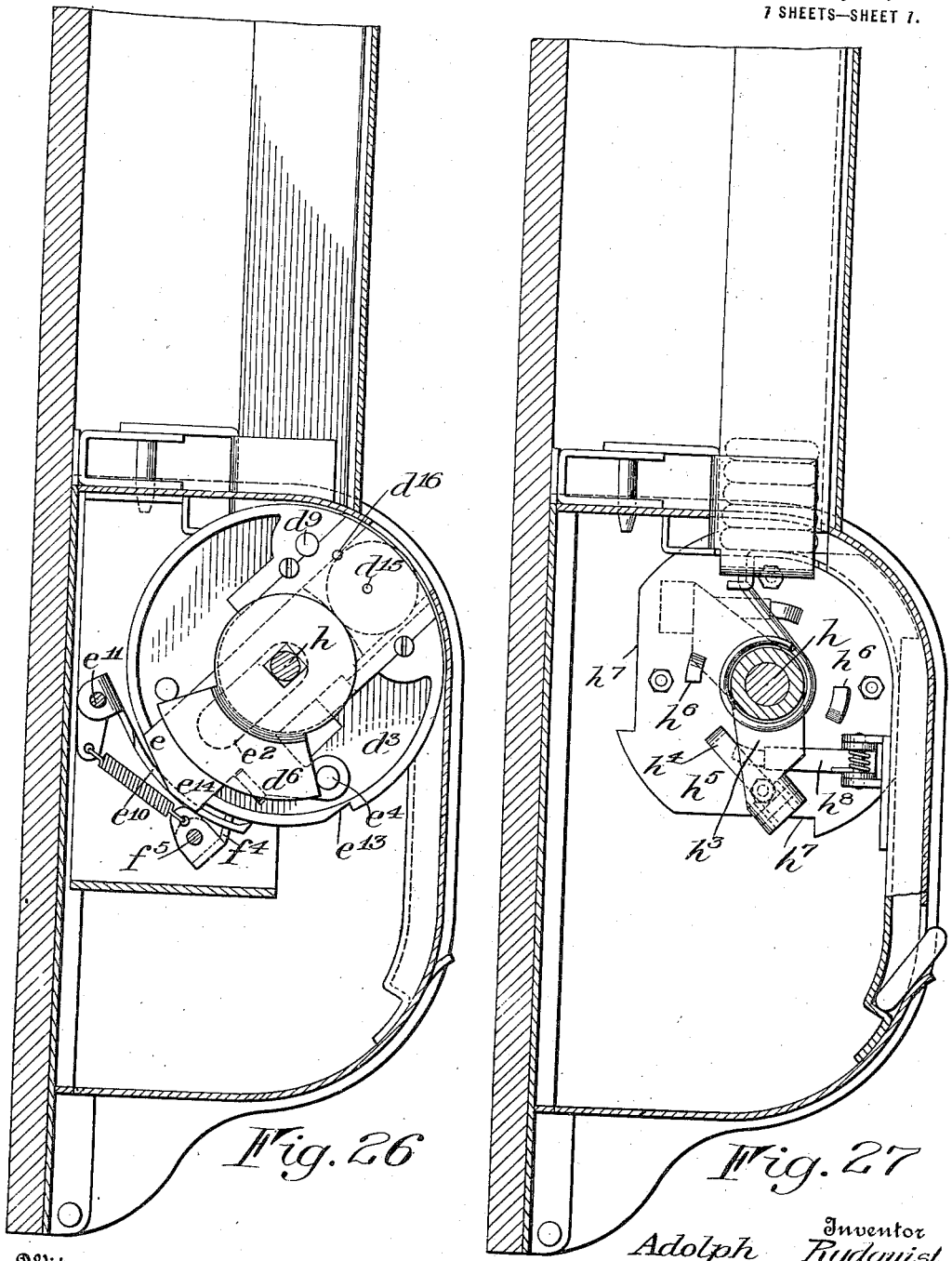

UNITED STATES PATENT OFFICE.

ADOLPH RYDQUIST, OF ROCHESTER, NEW YORK.

CHECK-CONTROLLED APPARATUS.

1,226,015.   Specification of Letters Patent.   Patented May 15, 1917.

Application filed December 17, 1913. Serial No. 807,162.

*To all whom it may concern:*

Be it known that I, ADOLPH RYDQUIST, of Rochester, in the county of Monroe and State of New York, have invented certain new and useful Improvements in Check-Controlled Apparatus; and I do hereby declare the following to be a full, clear, and exact description of the same, reference being had to the accompanying drawings, forming a part of this specification, and to the reference-numerals marked thereon.

My invention relates to check controlled apparatus, and it has for its object to simplify the construction of this class of machines, and with such simplified arrangement to afford an arrangement of parts that will enable the machine to be readily operated, and to reduce to a minimum the liability of the parts getting out of order. A further purpose of my invention consists in providing certain novel features, intended for sorting the coins, and rendering the machine inoperative upon the insertion of a spurious coin or check, the construction and disposition of the parts being such as to provide for testing a check both as to thickness and diameter, and for rejecting an improper one. Still a further purpose of my improvements resides in providing a construction whereby when an improper check is inserted, it can be ejected from the machine by an operation of the same device that is used to work the machine when a proper coin is inserted, the coin being discharged from the same opening into which it is inserted. Still a further purpose contemplated by my invention is to afford means for positively discharging the coin from the carrier at the end of the operation, so as to avoid any possibility of its lodging permanently in the carrier and locking the machine against further use. To these and other ends the invention consists in certain improvements and combinations of parts all as will be hereinafter more fully described, the novel features being pointed out in the claims at the end of the specification.

In the drawings:

Figure 1 is a vertical sectional view of a machine constructed in accordance with a preferred embodiment of my invention;

Fig. 2 is a rear elevation with the back of the casing removed;

Fig. 3 is a sectional view on the line $3^a$—$3^a$ of Fig. 1;

Fig. 4 is a horizontal sectional view on the line indicated at $4^a$ of Fig. 1;

Fig. 5 is an enlarged detail sectional view taken in the same plane as Fig. 4;

Fig. 6 is a vertical sectional view on the line $6^a$—$6^a$ of Fig. 3;

Fig. 7 is a sectional view on the line $7^a$—$7^a$ of Fig. 4;

Fig. 8 is a front elevation of the machine, a portion of the casing being broken away;

Fig. 9 is a sectional view taken through the central portion of the check carrier and casing;

Fig. 10 is a plan view of the check carrier, with parts broken away, and showing the arrangement of the positioning devices after a partial movement of the carrier, when a proper coin is inserted;

Fig. 11 is a similar view showing the arrangement of the positioning devices when a check having a central opening is inserted;

Fig. 12 is a similar view showing the arrangement of the positioning devices when too thin a check is inserted;

Fig. 13 is a sectional view on the line $13^a$—$13^a$ of Fig. 9, showing the check carrier, the check ejector and the operating means in elevation, in their normal relation;

Fig. 14 is a similar view, the operating means having been turned to carry the check carrier partially around;

Fig. 15 is a similar view, showing the coöperation between the check ejector and the locking member when the latter is disengaged from the carrier;

Fig. 16 is a view similar to Fig. 15, showing the position of the parts when an improper check is inserted in the carrier;

Fig. 17 is a similar view showing the position of the parts at the limit of the operative movement of the carrier;

Fig. 18 is a view showing the ejector moved upwardly within the check recess of the carrier by the operating member;

Fig. 26 is a transverse vertical sectional view on the line $26^a$—$26^a$ of Fig. 25, and Fig. 27 is a similar sectional view on the line $27^a$—$27^a$ of Fig. 25.

Similar reference numerals throughout the several figures indicate the same parts.

Figure 20:
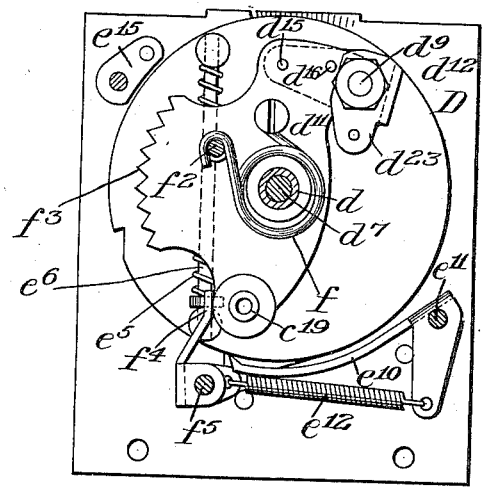
Fig. 20 is a sectional view on the line $20^a$—$20^a$ of Fig. 19, showing the position of the parts when the check carrier is in normal position.
Figure 21:
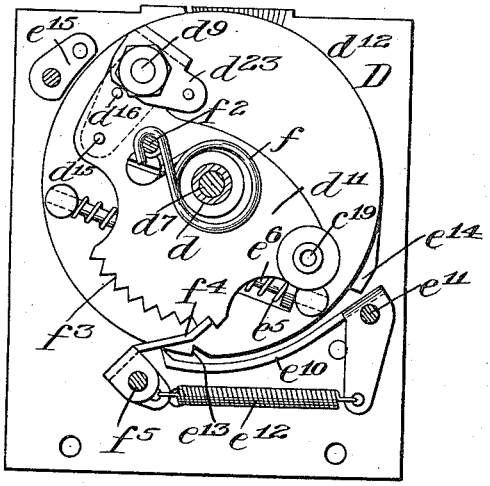
Fig. 21 is a similar view showing the position of the parts when the check carrier has been operated part way.
Figure 22:
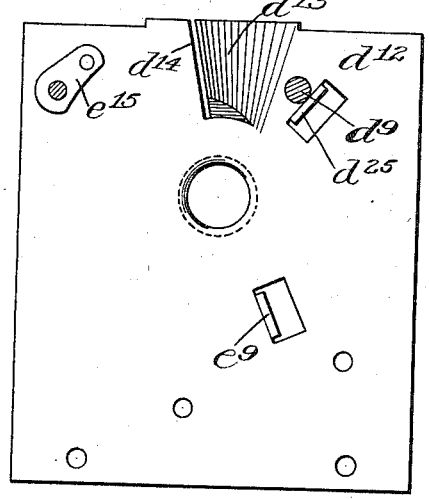
Fig. 22 is a similar view with the check carrier and coöperating parts removed.
Figure 19:
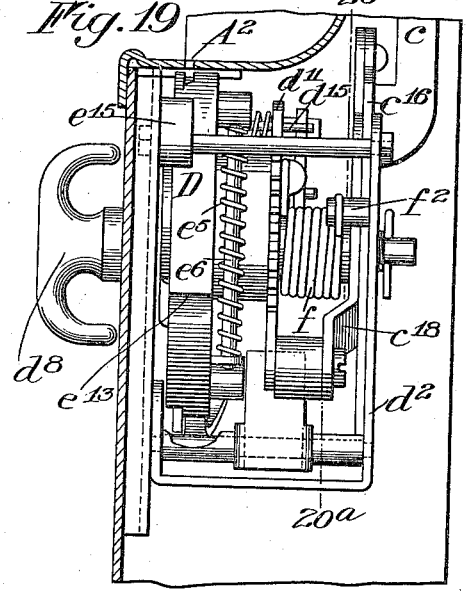
Fig. 19 is a vertical sectional view through a portion of the casing of the machine, showing the check carrier and coöperating parts in elevation, looking in the opposite direction from that of Fig. 1.

For convenience in the following description, I will employ the term "check," and "check-controlled," and intend thereby to refer to a coin, slug, of any form of blank that might be employed to operate a machine of this sort, and it will be understood that in the majority of instances, a coin is employed for this purpose. In the present embodiment, showing a preferred construction, A designates a suitable casing, the operating mechanism being located in the lower part thereof and controlled by a check carrier which I will describe more fully hereinafter, and into which a check may be inserted through the aperture $A^2$. The structure shown in Figs. 1 and 2 is applicable particularly to a machine for vending small articles such as chewing gum and candy in packages, although the invention may readily be applied to other types of vending apparatus, and in the present structure there are shown two receptacles or chutes $A^3$ within which the goods are placed as shown in Fig. 6. Each of the receptacles $A^3$ is provided with a delivering device, which preferably consists of a pair of disks $b$ connected by the circularly arranged rods $b^2$. Each of the disks $b$ of the delivering devices are cut away or otherwise constructed to form correspondingly located recesses $b^3$ which coöperate with the lowermost article in the receptacle and discharge it when the check carrier is operated as shown in Fig. 6. $b^4$ is a weighted follower which drops into the recess $b^3$ when the merchandise is exhausted, and prevents further operation of the machine. The rods $b^2$ are extended beyond the plates or disks $b$ as shown in Fig. 2 and are arranged to be engaged by an actuator which may comprise a rack bar $c$, and is suitably operated by the check carrier in a manner which will presently appear. The actuator $c$ is adjustable to coöperate with either one of the pair of delivering devices, so that the same check carrier mechanism may be utilized for controlling different articles of merchandise. To this end, the actuator $c$ is capable of a slight lateral play as shown in Fig. 3, and is engaged by the projections $c^2$ which are arranged upon the guide plate $c^3$. The guide plate $c^3$ has an upstanding portion $c^4$, the edge of which is provided with a series of teeth $c^5$ arranged to be engaged by a toothed segment $c^6$. The segment $c^6$ is fixed upon a shaft $c^7$ extending to the front of the machine where it is provided with an operating handle $c^8$. The shaft $c^7$ also carries an indicator $c^9$ which is disposed behind the transparent plate $c^{10}$ and can be seen through the opening $c^{11}$ of the casing as shown in Figs. 6 and 8. When the machine is to be operated, the person first turns the handle $c^8$ to the right or left according to what it is desired to purchase, and the indicator $c^9$ shows which article will be delivered. As long as the actuator $c$ is in its intermediate position, it cannot be operated owing to the engagement of a shoulder $c^{12}$ with the flange $c^{13}$ formed upon the plate $c^{14}$, but when the actuator is adjusted to one side or the other, it can travel vertically through one or the other of the recesses $c^{15}$ which are provided in said plate $c^{14}$.

The guide plate $c^3$ is cut away at $c^{20}$, the adjacent portions being beveled at $c^{21}$. The cut away portions $c^{20}$ are afforded to receive the adjacent disk of the corresponding delivering device, and when one delivering device is free to be actuated, the guide plate $c^3$ engages a recess $c^{22}$ in one of the disks of the other delivering device and locks it against movement.

The actuator $c$ embodies a right angle portion $c^{16}$ which is slotted at $c^{17}$ to engage its bearing as shown in Fig. 2 and $c^{18}$ is a curved link pivoted at its upper end to the actuator and at its lower end to a crank arm $c^{19}$ which is mounted upon the check carrier and movable therewith. The check carrier is designated generally at D and preferably is of circular form, and journaled on the sleeve $d$ which is suitably mounted in the frame $d^2$. The front of the carrier is shown clearly in Figs. 13 to 18 inclusive, being recessed or cut away as at $d^3$ and provided with a projection $d^4$. $d^5$ designates a recess in the carrier for receiving a check, and $d^6$ is the operating means comprising a segmental plate mounted upon a squared portion $d'$ of the shaft $d^7$, and adapted, when turned to the right, to engage the projection $d^4$ and move the carrier. The shaft $d^7$ is operated by a suitable handle $d^8$ fixed thereon and projecting outside the casing.

The operation of the machine is prevented, except when a proper check is inserted, by means of a locking member movably mounted on the check carrier, and adapted to come into engagement with a stationary abutment after a predetermined movement of the carrier, and in the present embodiment this is in the form of a movable pin $d^9$ which is fixed upon a frame $d^{10}$, and guided by an opening arranged in the plate $d^{11}$, in alinement with the corresponding opening in the carrier, the pin $d^9$ passing through both of said openings as shown in Figs. 10 to 12 inclusive. The locking member or pin $d^9$ is held in its normal position by means of the stationary plate $d^{12}$, and abuts against the stop $d^{25}$ formed on said plate. The plate $d^{12}$ is cut away or beveled to provide a recess at $d^{13}$ and a stationary locking abutment $d^{14}$ against which the locking member engages when the carrier is turned as shown in Figs. 10 to 12 inclusive, provided an improper check is inserted, and it will be understood that the movement of the parts from normal position to that shown in Fig. 11 is insufficient to effect an operation of the machine, while if a proper check has been inserted, the movable locking member will be held out of engagement with the locking abutment, thereby permitting the carrier to be turned farther, to effect a complete operation as will be explained presently. To this end, I provide a plurality of positioning devices which are so connected with the locking member as to move it into locking engagement with the stationary abutment when the carrier is turned, and said positioning devices are adapted to be controlled by the check when inserted and to be held against movement by said check, and when this condition prevails the locking member is held in such position as to clear the locking abutment as shown in Fig. 10. The purpose of providing a plurality of positioning devices is in order that a check may be tested both as to its thickness and diameter as well as other characteristics, as I am now about to describe, and to this end, I prefer to employ a pair of spring actuated pins $d^{15}$ and $d^{16}$ which are guided in suitable openings in the plate $d^{11}$ and frame $d^{10}$ as shown in Figs. 10 and 11, and pass through openings provided in the carrier so as to extend into the check receiving recess $d^5$ and to coöperate with the check therein. The positioning pins have fixed thereon disks $d^{17}$ and $d^{18}$, and are actuated by springs $d^{19}$ and $d^{20}$ respectively so as to move the disks $d^{17}$ and $d^{18}$ into engagement with the frame $d^{10}$ and thus move the locking member to position for engagement with the stationary abutment. The frame $d^{10}$ is actuated in the opposite direction, to carry the locking member back out of locking position, by means of a spring $d^{21}$, see Fig. 1, which is mounted on a rod $d^{22}$ arranged on the carrier, and engages the ear $d^{23}$ of the frame $d^{10}$. The springs $d^{19}$ and $d^{20}$ are both of sufficient pressure to overcome the spring $d^{21}$, so that if either one of the positioning pins is free to move, it will actuate the locking member, but on the other hand, if they are both held against movement by the check, the locking member will be held in its normal position by the spring $d^{21}$ and permit the carrier to move past the stationary abutment. The positioning pin $d^{15}$ is arranged to extend substantially into the central portion of the check recess as shown in Figs. 9 to 12 inclusive while the pin $d^{16}$ extends to a point at one edge of said recess so as to engage the periphery of the check as shown in Fig. 10. The engaging ends of the positioning pins are preferably pointed or conical as shown, and the check recess has a beveled wall $d^{24}$ at one edge, against which the check is wedged by the engagement of the pin $d^{16}$ as shown in Fig. 10. From this it will be seen that the check must be of the proper dimension for which the machine is designed in order to effect an operation. If the check is too thin, the bevel wall $d^{24}$ permits it to be forced away from the pin $d^{16}$, and the latter is free to move as shown in Fig. 12 and to carry the locking member into locking position, whereas if the thickness of the check is sufficient, the pin $d^{16}$ can not move far enough to lock the parts, see Fig. 10. Fig. 11 shows the position of the parts when a check is inserted with an opening in the center, and the locking member is operated by the pin $d^{15}$ in this manner whenever a check of this character or one made of cardboard or paper is employed. By this means, I provide a mechanism that will reject any check that is not of the proper dimensions, the arrangement of parts being very simple and affording a positive and dependable operation under all conditions.

When an improper coin or check is used, it is desirable to remove it from the machine, and to return it to the operator, and to this end in the present embodiment, I afford means for accomplishing this by turning the handle, which operates the machine, in a direction opposite to its normal movement. For this purpose, I prefer to employ a check ejector which in this instance is in the form of a slide mounted upon the carrier and adapted to be moved by the same operating means that turns the carrier. The check ejecting slide is designated at $e$, the carrier being recessed to receive said slide and to permit its movement within the check recess as shown in Fig. 18 for instance. The ejecting slide is slotted at $e^2$ to engage the shaft $d^7$ and has an extension $e^3$ provided with a pin or projection $e^4$ which is arranged to be engaged by the operating member $d^6$ when the latter is turned to the left as shown in Fig. 18. When the operating handle is turned in this direction, the check carrier remains stationary while the check ejecting slide moves upwardly and discharges the check at the same point where it was inserted. The ejector is held in its normal position against movement by means of a spring $e^5$ which is arranged on a post $e^6$ secured upon the carrier, and engages or abuts against an ear $e^7$ formed upon the ejector and extending through a slot or opening $e^8$ in the carrier.

It is highly important that at the end of the operation of the check carrier, means be provided for insuring the discharge of the check from the carrier into the machine, and to this end I make provision for positively moving the check ejecting slide relatively to the carrier at the termination of the latter's movement. This is preferably accomplished by providing a stationary lug $e^9$ upon the plate $d^{12}$, and arranged at such a point as to engage the projection $e^4$, see Fig. 17, when the carrier has been turned the proper distance. This holds the ejecting slide against further rotative movement, and as the carrier continues to the end of its turning movement, the slide is moved relatively thereto until it has reached the position of Fig. 17 and thus forces the check from the carrier.

In some instances, it is possible for an improper coin to successfully operate the positioning devices that I have already described, as for instance a metal check with a flat edge might be employed, and if inserted so as to present its full diameter to the positioning pins, the locking member would not be held against movement. To avoid a possibility of this sort, I prefer to employ a supplemental locking device that is normally engaged with the check carrier to lock the latter after a limited movement, and which is moved away from engagement with the carrier by releasing means arranged on the carrier and controlled by the inserted check. In the present embodiment, the movable locking member consists of a pawl $e^{10}$ pivoted on the shaft $e^{11}$ and controlled by the spring $e^{12}$. The pawl $e^{10}$ is normally held in engagement with the carrier by means of said spring and is positioned to drop into the notch or recess $e^{13}$ when the carrier has moved a limited distance as shown in Fig. 16, unless a proper check is inserted. In the present embodiment, the check ejecting slide already referred to constitutes the releasing means that controls the movable pawl $e^{10}$ and to this end, said slide is provided with a tail-piece or extension $e^{14}$ adapted to engage the pawl and move it out of locking engagement with the carrier as shown in Fig. 15, when a proper check is used. For this purpose, it is necessary to hold the check in fixed relation to the ejecting slide, as otherwise the latter will move relatively to the carrier by the pressure of the locking pawl as shown in Fig. 16. In order to effect such coöperation between the check and the ejecting slide, I provide a stationary stop or projection $e^{15}$ attached to the plate $d^{12}$ and arranged thereon at such a point as to engage the check and force the ejecting slide into releasing engagement with the pawl $e^{10}$ at the moment that the notch $e^{13}$ reaches said pawl during the turning movement of the carrier. This operation is shown clearly in Figs. 15 and 16, and in the latter, I have shown the position that the parts will assume if a check with a flat edge is presented to the stationary portion $e^{15}$. Under this condition, the pawl $e^{10}$ is not released and the carrier therefore cannot turn any farther.

The carrier is returned to its normal position by means of a spring $f$ which is connected at one end to a post $f^2$ upon the stationary frame $d^{12}$, and at its opposite end to the plate $d^{11}$ on the carrier. In order to insure a complete movement of the carrier after it has passed the locking pawl $e^{10}$, I provide the plate $d^{11}$ with a notched edge $f^3$, and coöperating therewith is a reversible pawl $f^4$ pivoted upon the rod $f^5$ and controlled by the spring $e^{12}$ already mentioned, said spring having its opposite ends connected to the pawls $f^4$ and $e^{10}$ and serving to actuate both of them.

Figure 25:
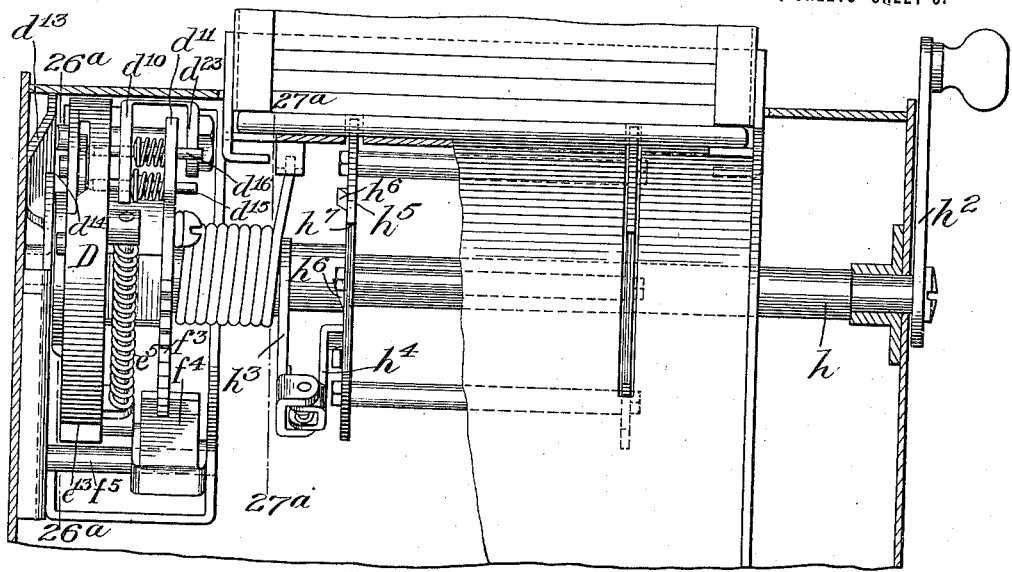
Fig. 25 is a sectional view of the same taken longitudinally.
Figures 23, 24:
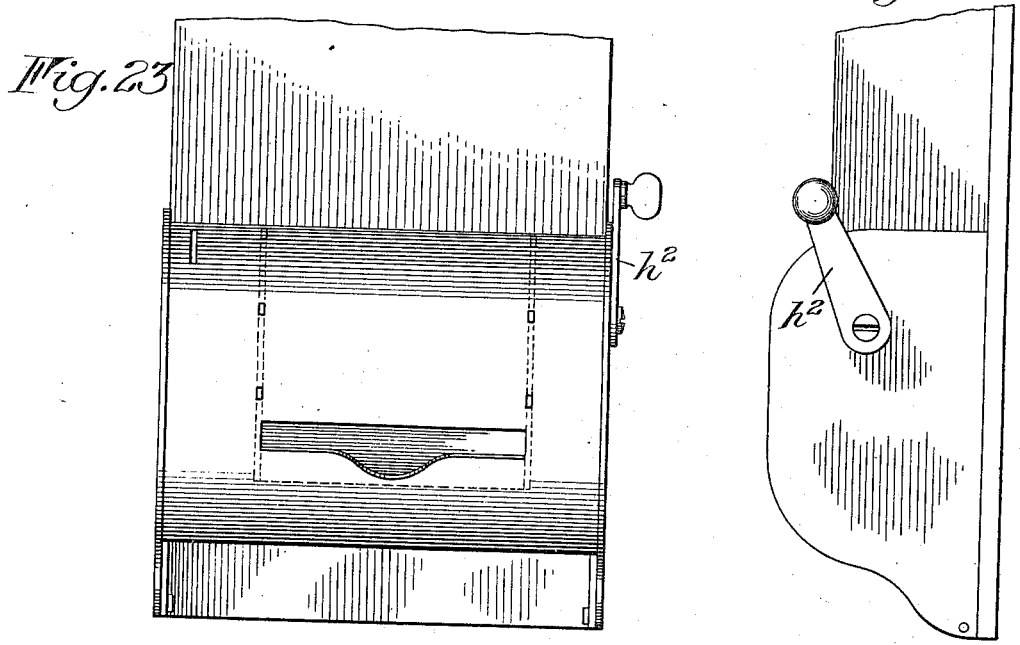
Fig. 23 is a front elevation of a machine embodying a modified form of my invention.
Fig. 24 is a side elevation of the same.

In Figs. 23 to 27 inclusive, I have shown the invention as applied to a slightly different type of machine, where it is desirable to eliminate the reciprocatory actuator, and to employ an operating handle at one side instead of at the front of the machine. In this form of construction, the controlling parts are the same as those I have already described, the operating means being mounted upon a shaft $h$ which carries the operating handle $h^2$. The carrier is provided with a sleeved extension upon which is mounted an arm $h^3$ carrying the pivoted pawl $h^4$, and the delivering device $h^5$ has upon its adjacent face a plurality of projections $h^6$ arranged to be engaged by said pawl when the carrier is turned as shown in Fig. 27. In this modified construction, the delivering device is continuously rotatable, having a pawl and ratchet connection with the check carrier and provided with a series of flat faces $h^7$ which coöperate with the articles of merchandise successively when the carrier is operated. The teeth or projections $h^6$ are beveled to permit the pawl $h^4$ to ride over the same during the return movement of the carrier, and the delivering device is held against return movement by means of a pawl $h^8$ which is pivotally mounted upon the frame of the machine and engages the projections $h^6$ as shown in Fig. 27 when the carrier is returned to its normal position.

I claim as my invention:

1. In a check controlled apparatus, the combination with an oscillatory check carrier, of an actuator operatively connected to the carrier, a locking abutment, a locking member movably supported on the carrier and adapted to coöperate with said abutment, and a check controlled positioning device parallel to and connected with the locking member and operating to move it relatively to the carrier when a proper coin is not inserted, so as to engage the abutment after a limited movement of the carrier.

2. In a check controlled apparatus, the combination with an oscillatory check carrier, of an actuator operatively connected to the carrier, a locking abutment, a locking member movably supported on the carrier and adapted to coöperate with said abutment, and a plurality of independent check controlled positioning devices coöperating with different portions of a check adapted to extend beyond the face of the check nearest thereto, said positioning devices being connected with the locking member and operating to move it relatively to the carrier when a proper coin is not inserted so as to engage the locking abutment after a limited movement of the carrier.

3. In a check controlled apparatus, the combination with an oscillatory check carrier, of an actuator operatively connected to the carrier, a locking abutment, a locking member movably supported on the carrier and adapted to coöperate with said abutment, and a pair of independent check controlled positioning devices, one coöperating with the central portion and the other with the exterior edge of a check, said positioning devices being connected with the locking member and operating to move it relatively to the carrier when a proper coin is not inserted, so as to engage the locking abutment after a limited movement of the carrier.

4. In a check controlled apparatus, the combination with a check carrier, of an actuator operatively connected to the carrier, a locking abutment, a locking member movably supported on the carrier, and a check controlled positioning device connected with the locking member arranged to extend beyond the face of the check nearest thereto and operating to move it relatively to the carrier when a proper coin is not inserted so as to engage the abutment upon a limited movement of the carrier.

5. In a check controlled apparatus, the combination with a check carrier, of an actuator operatively connected to the carrier, a locking abutment, a locking member movably supported on the carrier, and a plurality of independent check controlled positioning devices parallel to said locking member and coöperating with different portions of a check, said positioning devices being connected with the locking member and operating to move it relatively to the carrier, when a proper coin is not inserted so as to engage the abutment upon a limited movement of the carrier.

6. In a check controlled apparatus, the combination with a check carrier, of an actuator operatively connected to the carrier, a locking abutment, a locking member movably supported on the carrier, and a pair of independent check controlled positioning devices, one coöperating with the body portion and the other with the exterior edge of a check, said positioning devices being connected with the locking member and operating to move it relatively to the carrier when a proper coin is not inserted, so as to engage the abutment after a limited movement of the carrier.

7. In a check controlled apparatus, the combination with a check carrier having a recess to receive a check, of an actuator operatively connected to the carrier, a locking abutment, a locking member movably supported on the carrier, and a pair of check controlled positioning devices consisting of spring actuated pins connected with the locking member and extending into said recess of the carrier, one being disposed near the center of said recess and one near the edge thereof, the positioning devices operating to move the locking member relatively to the carrier when a proper coin is not inserted, so as to engage the abutment after a limited movement of the carrier.

8. In a check controlled apparatus, the combination with an oscillatory check carrier having a recess to receive a check, of an actuator operatively connected to the carrier, a locking abutment, a locking member movably supported on the carrier and adapted to coöperate with said abutment, and a check controlled positioning device consisting of a spring actuated pin axially movable of the carrier and connected with the locking member, the pin extending into said recess of the carrier and operating to move the locking member relatively to the carrier when a proper coin is not inserted, so as to engage the abutment after a limited movement of the carrier.

9. In a check controlled apparatus, the combination with an oscillatory check carrier having a recess to receive a check, of an actuator operatively connected to the carrier, a locking abutment, a locking member movably supported on the carrier and adapted to coöperate with said abutment, and a pair of check controlled positioning devices consisting of spring actuated pins axially movable of the carrier and connected with the locking member, one of said pins being disposed near the center of said recess and one near one edge thereof, the pins operating independently to move the locking member relatively to the carrier when a proper coin is not inserted so as to engage the abutment after a limited movement of the carrier.

10. In a check controlled apparatus, the combination with a check carrier, of an actuator operatively connected to the carrier, a locking abutment, a locking member movably supported on the carrier, and a pair of positioning devices connected with the locking member, one of said positioning devices being controlled by the central portion of a check and the other by the edge, said positioning devices operating to move the locking member relatively to the carrier when a proper coin is not inserted so as to engage the abutment after a limited movement of the carrier.

11. In a check controlled apparatus, the combination with a check carrier, of an actuator operatively connected to the carrier, a locking abutment, a locking member movably supported on the carrier, and a pair of positioning devices connected with the locking member and arranged in parallelism on the carrier and to the locking member, said positioning devices operating to move the locking member relatively to the carrier when a proper coin is not inserted so as to engage the abutment after a limited movement of the carrier.

12. In a check controlled apparatus, the combination with an oscillatory check carrier, of an actuator operatively connected to the carrier, a locking abutment, a locking member movably supported on the carrier, and a pair of positioning devices connected with the locking member in parallelism therewith, one of said positioning devices being controlled by the central portion of a check and one by the edge, said positioning devices operating to move the locking member relatively to the carrier when a proper coin is not inserted so as to engage the abutment after a limited movement of the carrier.

13. In a check controlled apparatus, the combination with an oscillatory check carrier, of an actuator operatively connected to the carrier, a locking abutment, a locking member movably supported on the carrier, and a pair of positioning devices connected with the locking member and arranged axially in parallelism on the carrier and parallel to the locking member, one of said positioning devices being controlled by the central portion of a check and the other by the edge, said positioning device operating to move the locking member relatively to the carrier when a proper coin is not inserted so as to engage the abutment after a limited movement of the carrier.

14. In a check controlled apparatus, the combination with a check carrier having a recess therein to receive a check, of an actuator operatively connected with the check carrier, a check ejector slidably mounted transversely of the carrier within said recess to effect removal of a check when the carrier is in its normal position.

15. In a check controlled apparatus, the combination with a check carrier having a recess therein to receive a check, of an actuator operatively connected with the check carrier, a check ejector movable within said recess to effect removal of a check, and operating means connected with the carrier and with the ejector and movable in opposite directions to effect movement of the ejector independently of the carrier, or of the carrier.

16. In a check controlled apparatus, the combination with a check carrier having a recess therein to receive a check, of an actuator operatively connected with the check carrier, a check ejecting slide movable within said recess to effect removal of a check, and operating means connected with the carrier and with the ejecting slide and movable in opposite direction to effect movement of the ejecting slide independently of the carrier, or of the carrier.

17. In a check controlled apparatus, the combination with an oscillatory check carrier having a recess therein to receive a check, of an actuator operatively connected with the check carrier, a check ejecting slide movable within said recess radially of the carrier to effect removal of a check, and a rotary operating means connected with the carrier and with the ejecting slide and movable in opposite directions to effect movement of the ejecting slide independently of the carrier, or of the carrier.

18. In a check controlled apparatus, the combination with an oscillatory check carrier having a recess therein to receive a check, of an actuator operatively connected with the check carrier, a check ejecting slide movable within said recess radially of the carrier to effect removal of a check, projections carried by the ejecting slide and carrier, and an operating member movable in opposite directions to engage either of said projections.

19. In a check controlled appartus, the combination with a check carrier, of an actuator operatively connected to the carrier, a locking abutment, a spring actuated check controlled positioning device adapted to extend beyond the face of the check nearest thereto and in engagement with said check and a movable locking member controlled by said check positioning device and arranged to engage said abutment upon movement of the carrier when a proper check is not inserted in the carrier whereby operation of the carrier is prevented.

20. In a check controlled apparatus, the combination with a check carrier having a recess therein to receive a check, of an actuator operatively connected with the carrier, a movable locking device mounted exteriorly of and in engagement with the carrier, and a check ejector movable on the carrier to eject a check from said recess and coöperating with said locking device when held in normal position by a check to move the locking device out of engagement with the carrier.

21. In a check controlled apparatus, the combination with a check carrier having a recess therein to receive a check, of an actuator operatively connected with the carrier, a movable locking device mounted exteriorly of and in engagement with the carrier, and a check ejecting slide movable on the carrier within said recess to eject a check, and coöperating with said locking device when held in normal position by a check to move the locking device out of engagement with the carrier.

22. In a check controlled apparatus, the combination with an oscillatory check carrier having a recess therein to receive a check, of an actuator operatively connected with the carrier, a movable locking device mounted exteriorly of and in engagement with the carrier, and a check ejector movable on the carrier to eject a check from said recess, and coöperating with said locking device when held in normal position by a check to move the locking device out of engagement with the carrier.

23. In a check controlled apparatus, the combination with an oscillatory check carrier having a recess therein to receive a check, of an actuator operatively connected with the carrier, a movable locking device mounted exteriorly of and in engagement with the carrier, and a check ejecting slide movable on the carrier within said recess to eject a check and coöperating with said locking device when held in normal position by a check to move the locking device out of engagement with the carrier.

24. In a check controlled apparatus, the combination with an oscillatory check carrier having a recess therein to receive a check, of an actuator operatively connected with the carrier, a movable locking device in engagement with the carrier, a check ejecting slide movable on the carrier within said recess to eject a check and coöperating with said locking device to move it out of engagement with the carrier, and a stationary portion disposed adjacent to the periphery of the carrier and adapted to engage the check during the movement of the carrier so as to hold the ejecting slide in releasing engagement with the locking member.

25. In a check controlled apparatus, the combination with an oscillatory check carrier having a recess therein to receive a check, of an actuator operatively connected with the carrier, a check ejecting slide movable on the carrier within said recess to eject a check, and a stop independent of the carrier arranged to engage the slide during the movement of the carrier whereby to effect movement of the slide within said recess.

26. In a check controlled apparatus, the combination with an oscillatory check carrier having a recess therein to receive a check, of an actuator operatively connected with the carrier, a check ejecting slide movable on the carrier within said recess to eject a check, operating means movable in one direction to actuate the slide independently of the carrier and in the opposite direction to operate the carrier, and a stop arranged to engage the slide during the movement of the carrier whereby to effect movement of the slide within said recess.

ADOLPH RYDQUIST.

Witnesses:
H. E. STONEBRAKER,
LEMY A. VAN COURT.